P. CUNNINGHAM.
BOMB-LANCE.
No. 171,553.  Patented Dec. 28, 1875.
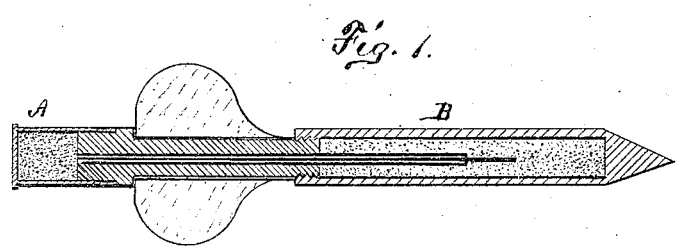
Witnesses.
Oliver Drake
J. G. Tunbridge
Inventor.
Patrick Cunningham

UNITED STATES PATENT OFFICE.

PATRICK CUNNINGHAM, OF NEWARK, NEW JERSEY, ASSIGNOR OF ONE HALF HIS RIGHT TO BERNARD COGAN, OF SAME PLACE.

IMPROVEMENT IN BOMB-LANCES.

Specification forming part of Letters Patent No. 171,553, dated December 28, 1875; application filed November 29, 1875.

*To all whom it may concern:*

Be it known that I, PATRICK CUNNINGHAM, of the city of Newark, in the county of Essex and State of New Jersey, have invented certain new and useful Improvements in Bomb-Lance for Killing Whales and other purposes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to certain improvements in the construction and combination of a bomb and cartridge, for killing whales, &c., whereby they are rendered impervious to the action of water or dampness, and always ready for immediate use, and also the operation of loading and discharging is facilitated.

My invention is fully illustrated in the accompanying drawing, in which Figure 1 is a longitudinal cross-section of a bomb-lance and cartridge, and Fig. 2 a cross-section of the same taken through line $x$, constructed and combined in accordance with the principle involved in said invention, which consists in combining the cartridge A with the bomb B, (the two being constructed and adapted therefor,) and also in grooving the bomb-shell B, all substantially as shown and indicated in the drawing, the object of the latter feature being to insure the bursting of the bomb-shell into a number of fragments, thereby greatly increasing its destructive power. I do not confine myself, however, to straight grooves, as indicated in the drawing, as said grooves may be made in spiral or diagonal lines, or otherwise, as may be preferred, the better to secure the result specified.

The cartridge A, as herein shown and illustrated, is designed to fit snugly on the end of the bomb, as indicated, with a water-tight joint, and is adapted to be used in a breech-loading gun, and may be constructed in the ordinary manner. It will be observed, however, that the fuse extends to the center of the charge in the bomb, causing its explosion at that point, the advantage of which will be obvious.

Having thus described my invention, what I claim as new, and desire to secure by Letters Patent of the United States, is—

A cartridge, A, and bomb B, when combined and arranged to operate substantially as herein set forth and shown, for the purposes specified.

In testimony that I claim the foregoing as my own invention, I affix hereto my signature in presence of two witnesses.

PATRICK CUNNINGHAM.

Witnesses:
 OLIVER DRAKE,
 BERNARD COGAN.